United States Patent [19]

Chin

[11] Patent Number: 5,518,372
[45] Date of Patent: May 21, 1996

[54] DC-POWERED CIRCUIT FOR CONTROLLING A RECIPROCATING PUMP OR MOTOR

[75] Inventor: Michael A. Chin, Milwaukee, Wis.

[73] Assignee: Linear Pump Corporation, Milwaukee, Wis.

[21] Appl. No.: 154,172

[22] Filed: Nov. 17, 1993

[51] Int. Cl.⁶ ............................................. F04B 49/06
[52] U.S. Cl. ........................... 417/45; 417/63; 417/415; 417/417
[58] Field of Search ........................ 318/115; 417/45, 417/415, 417, 63

[56] References Cited

U.S. PATENT DOCUMENTS

| | | | |
|---|---|---|---|
| 3,610,782 | 10/1971 | McGuire, III | 417/45 |
| 3,649,893 | 3/1972 | Lajoie | 318/119 |
| 4,200,832 | 4/1980 | Johansson et al. | 322/59 |
| 4,417,448 | 11/1983 | Horn et al. | 318/128 |
| 4,463,300 | 7/1984 | Mayne et al. | 318/687 |
| 4,583,027 | 4/1986 | Parker et al. | 318/128 |
| 4,737,696 | 4/1988 | Yokogawa et al. | 318/135 |
| 4,787,823 | 11/1988 | Hultman | 417/45 |
| 4,841,165 | 6/1989 | Bowles | 318/599 |
| 4,884,954 | 12/1989 | Van Niekerk | 417/417 |
| 5,085,563 | 2/1992 | Collins et al. | 417/417 |
| 5,087,865 | 2/1992 | Nelson, III | 318/139 |
| 5,267,344 | 11/1993 | Nelson, III | 318/138 |

Primary Examiner—Timothy S. Thorpe
Assistant Examiner—Xuan M. Thai
Attorney, Agent, or Firm—Foley & Lardner

[57] ABSTRACT

A DC-powered controller for a linear pump or motor is provided. The linear pump or motor is of the type that is includes a magnetic permeable member which is attracted to one end of a housing when a power coil is energized, and attracted to the other end of the housing when a reset coil is energized. The controller is connected to and powered by a DC-power source, such as a battery, and includes a voltage regulator, a control signal generator, and a dual coil driver circuit. The voltage regulator converts the battery voltage of the DC-power source to an operating voltage. The control signal generator is powered at the operating voltage and generates a square wave signal. The dual coil driver circuit receives the square wave signal and energizes the power coil during one phase of the square wave, and energizes the reset coil during the other phase of the square wave.

9 Claims, 3 Drawing Sheets

DC-POWERED CIRCUIT FOR CONTROLLING A RECIPROCATING PUMP OR MOTOR

BACKGROUND OF INVENTION

1. Field of the Invention

This invention relates to controllers for reciprocal-type pumps or motors and more particularly to a DC powered circuit for controlling linear type actuators.

2. Description of the Prior Art

Rotational motors using bearings, seals, cams and/or linkages for pumping gases or liquids, or for direct drive of such tools as automatic saws, clippers, or linear actuators for control of machinery are well known.

Pumps of this type are described in prior patents such as U.S. Pat. No. 3,437,044 entitled "Fluid Cooled Double Solenoid Pumping Mechanism", dated Apr. 8, 1969, and U.S. Pat. No. 3,282,219 entitled "Double Acting Solenoid Pump", dated Nov. 1, 1966. Pumps of the type described in these patents are driven by a relay which ultimately energizes two coils. The relays operate much too slowly and have too short a life expectancy to make relay-based pump controllers practical. Other controllers for reciprocating plunger-type pumps presently on the market, such as those which control automotive fuel pumps and refrigeration pumps, control a single coil to move the plunger in one direction and a spring to return the plunger to its initial position. Springs are subject to fatigue failure and cannot be controlled to provide variable pressure or flow.

To overcome the many disadvantages of the pump controllers described above, a reciprocating linear pump controllable by an alternating current-powered solid state circuit has been developed. A pump of this type is described in U.S. Pat. No. 5,085,563 entitled "Reciprocating Pump or Motor", dated Feb. 4, 1992, which is hereby incorporated herein by reference. The unique solid state circuit described in this patent is able to operate pumps at a high speed of operation. However, the solid state circuit described is powered by an alternating current source. Unfortunately, there are many circumstances in which the use of alternating current is impractical or impossible. For example, it is often difficult to provide alternating current to devices which are designed to be mobile. In such cases, it is clearly desirable to provide a circuit capable of being powered by direct current for controlling a linear pump or motor.

SUMMARY OF THE PRESENT INVENTION

According to one aspect of the present invention, a control circuit powered by a direct current power source for alternately energizing a first coil and a second coil to drive a pump or motor is provided. The control circuit includes a voltage regulator, connected to the direct current power source, which is arranged to generate a regulated operating voltage over an operating voltage conductor, and a control signal generator connected to the operating voltage conductor. The control signal generator is arranged to generate a square wave signal alternating between a logical HIGH and a logical LOW over a square wave signal conductor. The control circuit further includes a dual coil driver circuit connected to the direct current power source, the square wave signal conductor, the operating voltage conductor, and the first and second coils. The dual coil driver circuit energizes the first coil when the square wave signal is at a logical HIGH and energizes the second coil when the square wave signal is at a logical LOW.

According to another aspect of the invention, a DC-powered linear pump system is provided. The system includes a linear motion reciprocating pump, a direct current power source, and a control circuit, connected with and powered by the direct current power source, for alternately energizing a power coil and a reset coil. The pump includes a cylindrical housing, a magnetically permeable plunger mounted for reciprocal motion in the housing. The power coil is mounted on one end of the housing for attracting the plunger toward the one end, and the reset coil is mounted on the other end of the housing for attracting the plunger toward the other end of the housing.

The control circuit includes a control signal generator arranged to generate a control signal having a first phase and a second phase over a control signal conductor, and a dual coil driver circuit connected to the direct current power source, the control signal conductor, and the power and reset coils. The dual coil driver circuit energizes the power coil when the control signal is in the first phase and energizes the reset coil when the control signal is in the second phase.

Figure 3:
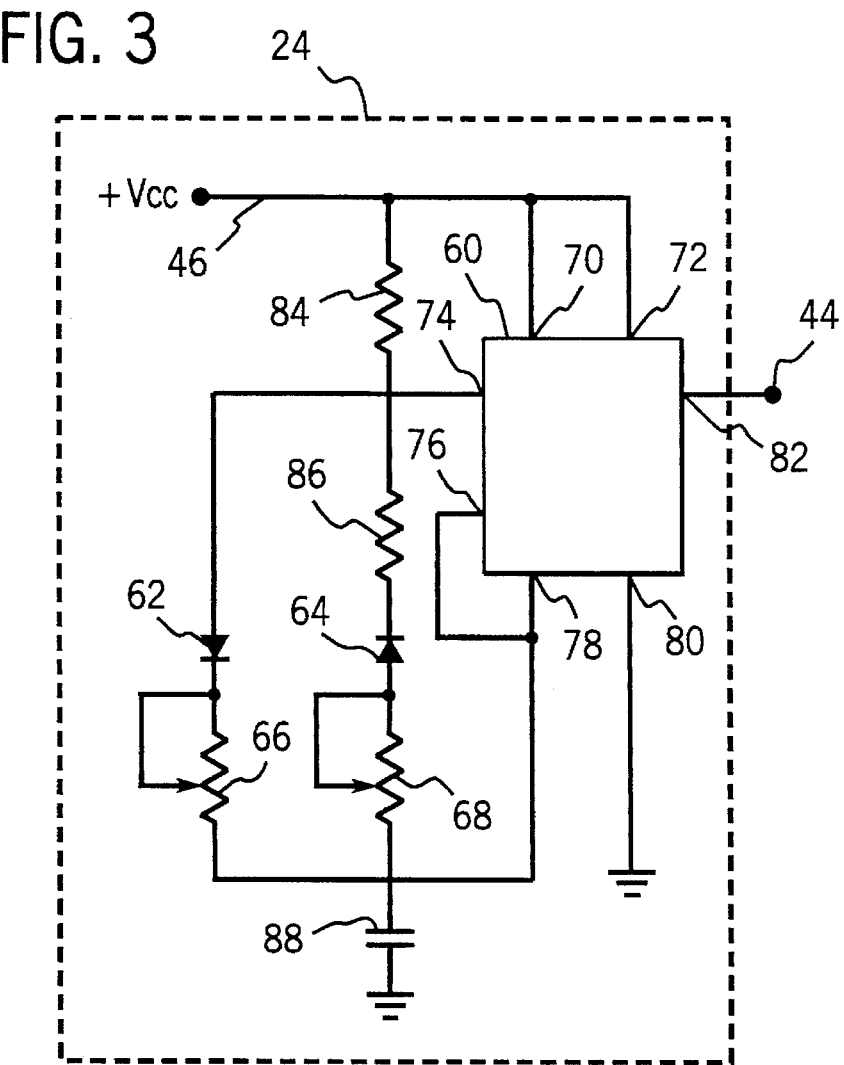
FIG. 3 is a schematic view of the control signal generator shown in FIG. 1.

Before explaining at least one embodiment of the invention in detail, it is to be understood that the invention is not limited in its application to the details of construction and the arrangement of the components set forth in the following description or illustrated in the drawings. The invention is capable of other embodiments or being practiced or carried out in various ways. For example, the control signal generator of the present invention need not be limited to the particular circuit configuration shown in FIG. 3. The circuit shown in FIG. 3 is simply one means for producing the control signal. In addition, the control signal need not be limited to a square wave signal, but can also be of another type of signal waveform such as a sine wave. Also, it is to be understood that the phraseology and terminology employed herein is for the purposes of description and should not be regarded as limiting.

DETAILED DESCRIPTION OF THE PREFERRED EMBODIMENT

Figure 1:
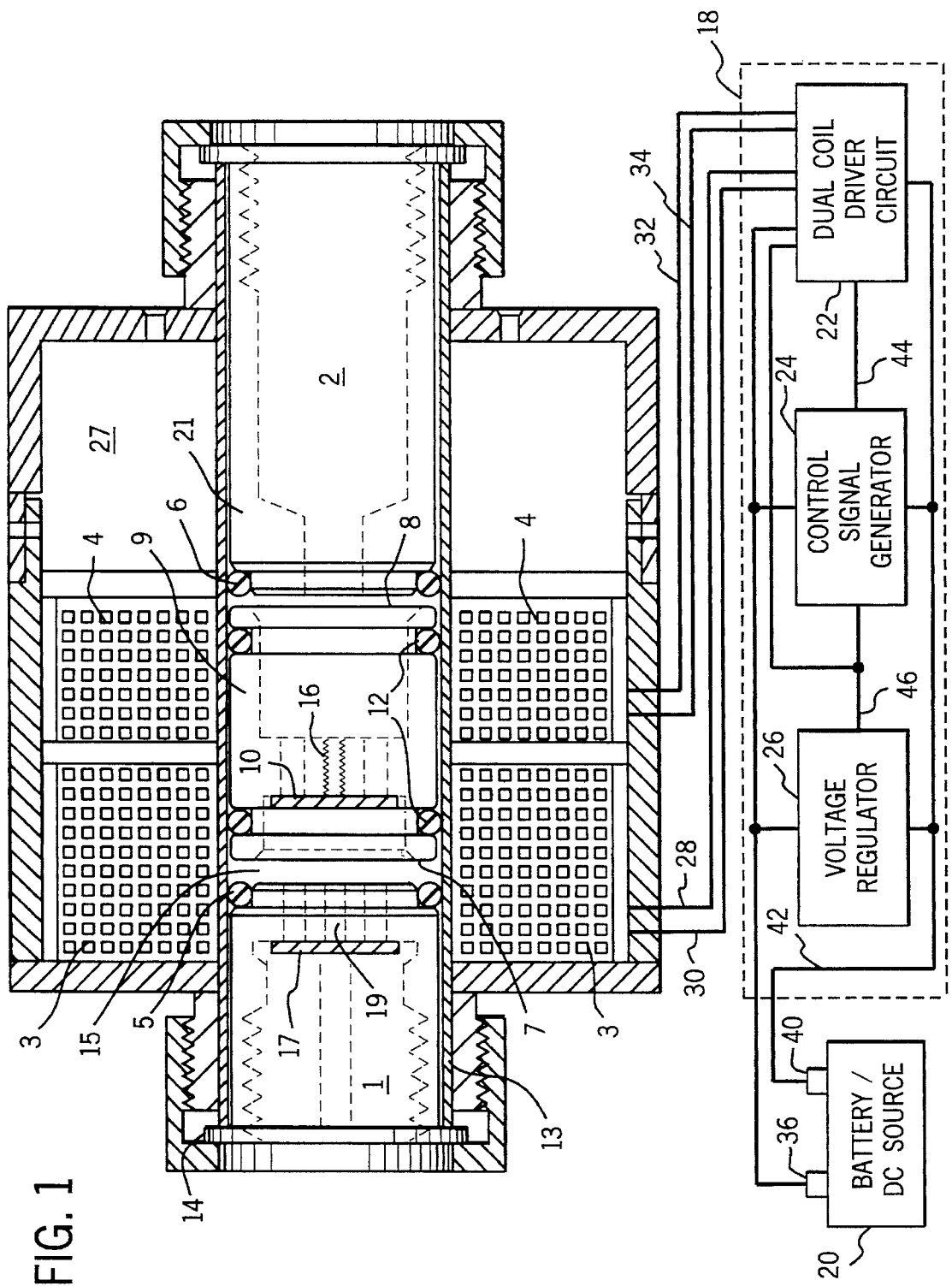
FIG. 1 is a cross-sectional view of a linear pump connected with a DC-powered control circuit according to the invention.

A cross sectional view of a pump controlled by a controller of the type contemplated herein is shown in FIG. 1. As seen in the drawing, the pump includes a cylindrical housing 13 having a fluid inlet 2 formed in a back plug 21 mounted on one end and a fluid outlet 1 formed in a front plug 14 mounted on the other end. The inlet 2 includes a flow passage and the outlet 1 includes a flow passage.

A plunger 9 is mounted for reciprocal motion within the housing 13. Plunger 9 has a front end 7 and a back end 8. Means are provided at each end of the housing 13 to cushion the motion of the plunger 9. Such means is in the form of resilient bumpers 5 and 6. A power coil 3 is provided at the outlet end of the housing 13 and a reset coil 4 is provided at the inlet end of housing 13.

Means are provided for controlling the opening and closing of the holes which control the flow of water through bores in the pump. Such means is in the form of a plurality of rubber surfaced check valves 10 and 17 provided on the plunger 9 and front plug 14, respectively. A plurality of floating O-rings 12 encircle plunger 9, insulating plunger 9 from the walls of housing 13. The O-rings 12 both reduce wear on plunger 9 and reduce fluid blow-by around plunger 9 during pump operation. Plunger 9 is driven in a reciprocal motion between bumpers 5 and 6 as coils 3 and 4 are alternately energized by a DC-powered control circuit 18. While control circuit 18 is shown external to the pump, control circuit 18 is preferably located within a cavity 27 of the pump.

Control circuit 18 is powered by a DC power source, such as a battery 20, and generally includes a dual coil driver circuit 22, a control signal generator 24, and a voltage regulator 26. Dual coil driver circuit 22 is connected with power coil 3 by a plurality of conducting lines 28 and 30, and with reset coil 4 by a plurality of conducting lines 32 and 34. Dual coil driver circuit 22 is further connected with a positive terminal 36 of battery 20 by a line 38, and to a negative terminal 40 (ground) of battery 20 by a line 42. Dual coil driver circuit 22 is further connected with control signal generator 24 by a line 44, and with voltage regulator 26 by a line 46.

Control signal generator 24 is connected to ground by line 42, and to voltage regulator 26 by line 46. Voltage regulator 26 is connected to positive terminal 36 by line 38, and to ground by line 42.

Voltage regulator 26 converts the voltage of battery 20 (battery voltage) to a stable operating voltage (Vcc) which voltage regulator 26 supplies to control signal generator 24 and dual coil driver circuit 22 over line 46. Control signal generator 24 is powered by Vcc over line 46, and is configured to generate a square wave signal over line 44. The duration of each phase of the square wave generated by control signal generator 24 is separately adjustable, as will be described in reference to FIG. 3.

Dual coil driver circuit 22 receives the square wave signal over line 44 and applies the battery voltage over lines 28 and 30 to energize power coil 3 during one phase of the square wave, and applies the battery voltage over lines 32 and 34 to energize reset coil 4 during the other phase of the square wave. Dual coil driver circuit 22 will be described in greater detail below with reference to FIG. 4.

The plunger 9 is shown in the backward or reset position at the completion of the reset coil 4 pulse. The stroke of the plunger 9 is always started from midpoint of the coil for both the forward and backward strokes of the plunger. This location for the start of the stroke causes the rubber surfaced ferrous front end 7 to always be initially attracted forward, toward front plug 14, just prior to the movement of the plunger 9.

For example, when the power coil 3 is energized, the ferrous metal front end 7 of the plunger 9 is attracted forward, causing the plunger 9 to move through the power stroke. A pressure build up in a cavity 15 forward of the plunger 9 forces washer 10 against the fluid flow holes 16 in plunger 9, thus sealing the holes 16. Fluid is thereby forced through the holes 19 in the front plug 14, and out of the pump. When the reset coil 4 is energized, the plunger 9 will move through the return stroke. A rubber surfaced check valve 17 on the front plug 14 seals the fluid flow holes 19 in the front plug 14 during the return stroke of the plunger 9. Thus, during the return stroke, cavity 15 fills with fluid which flows through holes 16 from inlet 2, while fluid from outlet 1 is prevented from returning to cavity 15 by check valve 17.

Figure 2:
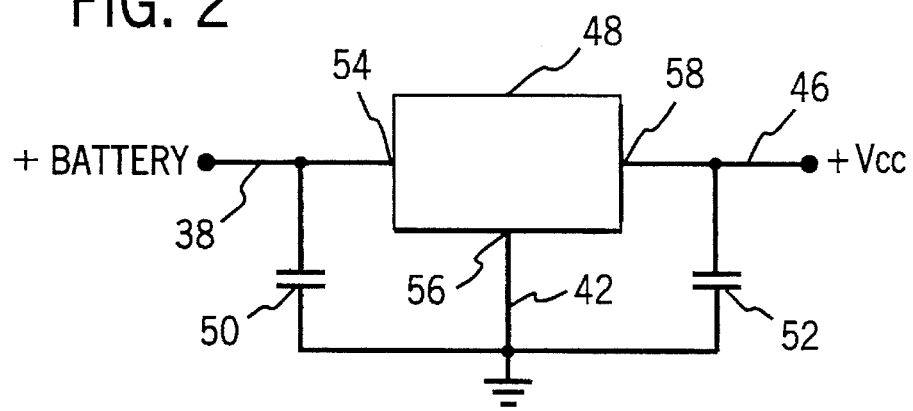
FIG. 2 is a schematic view of the voltage regulator circuit shown in FIG. 1.

Referring to FIG. 2, voltage regulator 26 includes an integrated circuit 48 designed to provide a stable operating voltage, such as semiconductor chip model number LM340T generally available from National Semiconductor, Inc., and a plurality of capacitors 50 and 52. Integrated circuit 48 has three ports 54, 56, and 58. Port 54 is connected to line 38, and to ground through capacitor 50. Port 56 is connected to ground. Port 58 is connected to line 46 and to ground through capacitor 52. Integrated circuit 48 receives the battery voltage over line 38 at port 54, converts the voltage to Vcc, and transmits Vcc on line 46 through port 58. Capacitors 50 and 52 serve to generally soften the voltage fluctuations which may occur over lines 38 and 46, respectively.

Referring to FIG. 3, control signal generator 24 generally comprises an integrated circuit 60, a plurality of diodes 62 and 64, and a plurality of variable resistors 66 and 68. Integrated circuit 60 has a plurality of ports 70, 72, 74, 76, 78, 80 and 82. Ports 70 and 72 are connected to line 46. Port 74 is connected to line 46 through a resistor 84, to diode 64 through a resistor 86, and to diode 62. Ports 76 and 78 are connected with ground through a capacitor 88 and to variable resistors 66 and 68. Port 80 is connected to ground. Port 82 is connected to line 44.

Integrated circuit 60 is configured to generate a square wave at port 82 responsive to the settings of variable resistors 66 and 68. For example, integrated circuit 60 may be semiconductor chip model number LMC555, generally available from National Semiconductor, Inc. The duration of the high phase of the square wave generated at port 82 is determined by the setting of variable resistor 66, while the duration of the low phase of the square wave generated at port 82 is determined by the setting of variable resistor 68. Variable resistors and 68 may preferably be potentiometers adjustable by a user during operation of a pump or motor controlled by circuit 18.

Figure 4:
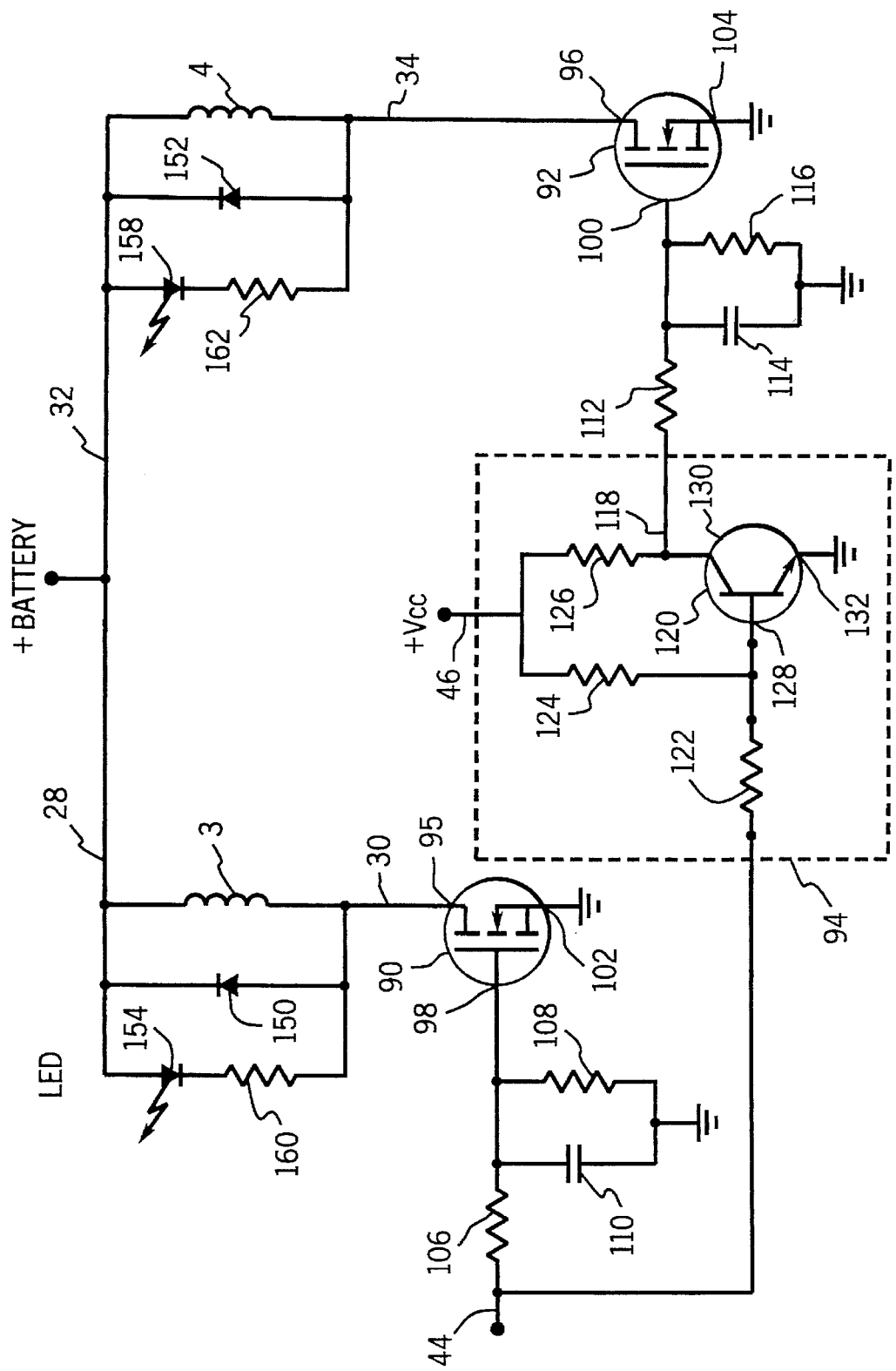
FIG. 4 is a schematic view of the dual coil driver circuit shown in FIG. 1.

Referring to FIG. 4, dual coil driver circuit 22 generally includes a plurality of switches 90 and 92 and an inverter circuit 94. Switches 90 and 92 are preferably MOSFETs, each having a drain (95, 96), a gate (98, 100), and a source (102, 104) and being configured to allow current to flow from drains 95, 96 to sources 102, 104 when a positive voltage is applied at their gates 98, 100.

The drain 95 of MOSFET 90 is connected to line 30, and the drain 96 of MOSFET 92 is connected to line 34. The sources 102 and 104 of MOSFETs 90 and 92, respectively, are connected to ground.

The gate of MOSFET 90 is connected to line 44 through a resistor 106, to ground through a resistor 108, and to ground through a capacitor 110. The gate 100 of MOSFET 92 is connected to line 44 through a resistor 112 and inverter circuit 94, to ground through a resistor 116, and to ground through a capacitor 114.

When the voltage on line 44 is HIGH, a HIGH is applied to gate 98 of MOSFET 90 to allow current to flow from drain 95 to source 102. Since source 102 is connected to ground, a HIGH voltage on line 44 has the effect of driving drain 95 to ground. Conversely, when the voltage on line 44 is LOW, current cannot flow from drain 95 to source 102, so drain 95 is not grounded. Capacitor 110 has the effect of delaying the voltage rise at gate 98, while resistor 108 has the dual effect of assisting the charge/discharge of capacitor 110 and splitting the voltage on line 44 to reduce the voltage level supplied at gate 98.

When the voltage on line 44 is HIGH, a HIGH is applied to inverter circuit 94, which inverts the signal on line 44, and generates the inverted signal at a line 118. The LOW is applied to gate 100 of MOSFET 92, so no current is allowed to flow from drain 96 to source 104. Conversely, when the voltage on line 44 is LOW, inverter circuit 94 inverts the voltage to a HIGH which is applied to gate 100 over line 118. Since source 104 is connected to ground, a HIGH voltage on line 44 has the effect of driving drain 96 to ground. Similar to capacitor 110 and resistor 108, capacitor 114 has the effect of delaying the voltage rise at gate 100, while resistor 116 has the dual effect of assisting the charge/discharge of capacitor 114 and splitting the voltage on line 118 to reduce the voltage level supplied at gate 100.

One end of power coil 3 and one end of reset coil 4 are connected to battery voltage by lines 28 and 32 respectively. The other ends of power coil 3 and reset coil 4 are connected to drains 95 and 96 by lines 30 and 34 respectively. Hence, when the signal on line 44 is HIGH, line 30 is driven to ground through MOSFET 90. Since line 28 is at battery voltage, current flows through power coil 3 from line 28 to grounded line 30, and power coil 3 is energized. However, since drain 96 is not grounded when line 44 is HIGH, line 34 is not driven to ground, and reset coil 4 is not energized. When the signal on line 44 goes LOW, line 30 is no longer driven to ground so coil 3 is no longer energized. However, since line 34 is driven to ground when line 44 goes LOW, so reset coil 4 is energized. Consequently, power coil 3 is energized only when the signal on line 44 is HIGH, and reset coil 4 is energized only when the signal on line 44 is LOW.

As described above, the signal on line 44 is a square wave generated by control signal generator 24. Also, control signal generator 24 allows a user to independently control the durations of the phases of the square wave generated on line 44. Consequently, circuit 18 allows a user may select both the speed of pump or motor operation, and the relative duration of each phase of pump or motor operation.

Dual coil driver circuit 22 further includes a plurality of diodes 150 and 152. Diode 150 is connected between lines 28 and 30 parallel to power coil 3. Diode 150 is arranged to allow current to flow from line 30 to line 28. Thus disposed, diode 150 suppresses counter EMF created by the inductance of coil 3 when coil 3 is deenergized. Similarly, diode 152 is connected between lines 32 and 34 parallel to reset coil 4. Diode 152 is arranged to allow current to flow from line 34 to line 32. Thus disposed, diode 152 suppresses counter EMF created by the inductance of coil 4 when coil 4 is deenergized.

Dual coil driver circuit 22 may optionally include a plurality of light emitting diodes 154 and 158. Diode 154 is connected to line 28, and to line 30 through a resistor 160. Diode 154 is disposed to emit light when the voltage on line 28 is greater than the voltage on line 30. Diode 158 is connected to line 32, and to line 34 through a resistor 162. Diode 158 is disposed to emit light when the voltage on line 32 is greater than the voltage on line 34. Thus configured, diode 154 emits light when power coil 3 is energized, and diode 158 emits light when reset coil 4 is energized. Diodes 154 and 158 therefore provide a user with visual indicia of the speed at which dual coil driver circuit 22 is driving a pump or motor.

Inverter circuit 94 generally comprises a transistor 120 and a plurality of resistors 122, 124 and 126. Transistor 120 has a base 128, a collector 130, and an emitter 132. The base 128 of transistor 120 is connected to line 44 through resistor 122, and to line 46 through resistor 124. The collector 130 of transistor 120 is connected to line 118, and to line 46 through resistor 126. The emitter 132 of transistor 120 is connected to ground.

When the signal on line 44 is HIGH, the signal at the base 128 of transistor 120 is HIGH, and current is allowed to flow from collector 130 to emitter 132. Since emitter 132 is connected to ground, collector 130 is driven to ground when the signal over line 44 is HIGH, producing a LOW on line 118. As described above, a LOW signal on line 118 prevents reset coil 4 from being energized.

When the signal on line 44 is LOW, the voltage at base 128 is LOW, and collector 130 is not driven to ground. Since line 118 is connected to line 46 through resistor 126, and line 46 is at Vcc, line 118 goes HIGH. As described above, a HIGH on line 118 causes reset coil 4 to be energized.

The subject of this patent application, a DC-powered circuit for controlling a linear motor or pump, has numerous advantages over existing commercially available AC-powered control circuits. For example, a pump or motor may be controlled by the present invention at locations where an AC power source is not available. Further, the ability to power the present control circuit by a battery allows linear pumps and motors controlled by the invention to be used in applications that would otherwise be impractical or impossible, such as applications where easy mobility is required.

Thus, it should be apparent that there has been provided in accordance with the present invention a control circuit for a reciprocating pump or motor that fully satisfies the aims and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments in which an exclusive property or privilege is claimed are defined as follows:

1. A control circuit powered by a direct current power source for alternately energizing a first coil and a second coil to drive a pump or motor, comprising:

a voltage regulator connected to said direct current power source, said voltage regulator being arranged to generate an operating voltage over an operating voltage conductor;

a control signal generator connected to said operating voltage conductor, said control signal generator being arranged to generate a square wave signal alternating between a logical HIGH and a logical LOW over a square wave signal conductor; and a dual coil driver circuit connected to said direct current power source, said square wave signal conductor, said operating voltage conductor, and said first and second coils, said dual coil driver circuit energizing said first coil when said square wave signal is at a logical HIGH and energizing said second coil when said square wave signal is at a logical LOW;

Wherein said first coil has a first end and a second end, said second coil has a first end and a second end, said direct current source having a positive terminal and a ground terminal, said first ends of said first and second coil being connected to said positive terminal, said dual coil driver comprising:

a first switch connected to said second end of said first coil, to said ground terminal, and to said square wave signal conductor;

said first switch being arranged to connect said second end of said first coil to said ground terminal when said square wave signal is HIGH;

an invertor circuit connected to said square wave signal conductor for generating an inverted square wave signal; and a second switch connected to said second end of said second coil, to said ground terminal, and to invertor circuit;

said second switch being arranged to connect said second end of said second coil to said ground terminal when said inverted square wave signal is HIGH.

2. The control circuit of claim 1 wherein said first and second switches are MOSFETs.

3. The control circuit of claim 1 wherein said dual coil driver circuit includes a first diode connected between said first and second ends of said first coil, said first diode being disposed to allow current to flow from said second end of said first coil to said first end of said first coil, thereby suppressing counter EMF when said first coil is deenergized.

4. The control circuit of claim 3 wherein said dual coil driver circuit includes a second diode connected between said first and second ends of said second coil, said second diode being disposed to allow current to flow from said second end of said second coil to said first end of said second coil, thereby suppressing counter EMF when said second coil is deenergized.

5. A control circuit powered by a direct current power source for alternately energizing a first coil and a second coil to drive a pump or motor, comprising:

a voltage regulator connected to said direct current power source, said voltage regulator being arranged to generate an operating voltage over an operating voltage conductor;

a control signal generator connected to said operating voltage conductor, said control signal generator being arranged to generate a square wave signal alternating between a logical HIGH and a logical LOW over a square wave signal conductor; and a dual coil driver circuit connected to said direct current power source, said square wave signal conductor, said operating voltage conductor, and said first and second coils, said dual coil driver circuit energizing said first coil when said square wave signal is at a logical HIGH and energizing said second coil when said square wave signal is at a logical LOW;

said dual driver includes means for generating visual indicia of when said first and second coils are energized;

said means for generating visual indicia includes:

a first light emitting diode connected in parallel with said first coil, said first light emitting diode being arranged to emit light when said first coil is energized; and a second light emitting diode connected in parallel with said second coil, said second light emitting diode being arranged to emit light when said second coil is energized.

6. A DC-powered linear pump system comprising:

a linear motion reciprocating pump, including a cylindrical housing, a magnetically permeable plunger mounted for reciprocal motion in said housing, a power coil mounted on one end of said housing for attracting said plunger toward said one end, and a reset coil mounted on said other end of said housing for attracting said plunger toward said other end of said housing;

a direct current power source; and a control circuit, connected with and powered by said direct current power source, for alternately energizing said power coil and said reset coil;

said control circuit including a control signal generator arranged to generate a control signal having a first phase and a second phase over a control signal conductor, and a dual coil driver circuit connected to said direct current power source, said control signal conductor, and said power and reset coils, said dual coil driver circuit energizing said power coil when said control signal is in said first phase and energizing said reset coil when said control signal is in said second phase, wherein said power coil has a first end and a second end, said reset coil has a first end and a second end, said direct current source having a positive terminal and a ground terminal, said first ends of said first and reset coil being connected to said positive terminal, said dual coil driver comprising:

a first switch connected to said second end of said power coil, to said ground terminal and to said control signal conductor;

said first switch being arranged to connect said second end of said power coil to said ground terminal when said control signal is in said first phase;

an invertor circuit connected to said control signal conductor for generating an inverted control signal; and a second switch connected to said second end of said reset coil, to said ground terminal, and to invertor circuit;

said second switch being arranged to connect said second end of said reset coil to said ground terminal when said inverted control signal is in said first phase.

7. The DC-powered linear pump system of claim 6 wherein said first and second switches are MOSFETs.

8. The DC-powered linear pump system of claim 6 wherein said dual coil driver circuit includes a first diode connected between said first and second ends of said power coil, said first diode being disposed to allow current to flow from said second end of said power coil to said first end of said power coil, thereby suppressing counter EMF when said power coil is deenergized.

9. The DC-powered linear pump system of claim 8 wherein said dual coil driver circuit includes a second diode connected between said first and second ends of said reset coil, said second diode being disposed to allow current to flow from said second end of said reset coil to said first end of said reset coil thereby suppressing counter EMF when said reset coil is deenergized.

* * * * *